United States Patent [19]

Ward

[11] Patent Number: 4,823,326
[45] Date of Patent: Apr. 18, 1989

[54] SEISMIC DATA ACQUISITION TECHNIQUE HAVING SUPERPOSED SIGNALS

[75] Inventor: Roger M. Ward, Carrollton, Tex.

[73] Assignee: The Standard Oil Company, Cleveland, Ohio

[21] Appl. No.: 65,557

[22] Filed: Jun. 23, 1987

Related U.S. Application Data

[63] Continuation-in-part of Ser. No. 887,377, Jul. 21, 1986, abandoned, which is a continuation-in-part of Ser. No. 813,593, Dec. 26, 1985, abandoned.

[51] Int. Cl.$^4$ .............................................. G01V 1/143
[52] U.S. Cl. ....................................... 367/41; 367/23; 364/421
[58] Field of Search ................................... 367/38–42, 367/50, 51, 59; 364/421

[56] References Cited

U.S. PATENT DOCUMENTS

| | | |
|---|---|---|
| 2,920,306 | 1/1960 | Feagin et al. |
| 2,981,928 | 4/1961 | Crawford et al. |
| 2,989,726 | 6/1961 | Crawford et al. |
| 3,185,958 | 5/1965 | Masterson et al. |
| 3,221,298 | 11/1965 | Burns |
| 3,259,878 | 7/1966 | Mifsud |
| 3,288,243 | 11/1966 | Silverman |
| 3,326,320 | 6/1967 | Forester |
| 3,332,511 | 7/1967 | Silverman ............................. 367/59 |
| 3,332,512 | 7/1967 | Sundt |
| 3,363,720 | 1/1968 | Mifsud et al. |
| 3,375,896 | 4/1968 | Beddo |
| 3,386,525 | 6/1968 | Landrum et al. |
| 3,516,510 | 6/1970 | Coburn et al. |
| 3,523,277 | 8/1970 | Landrum, Jr. |
| 3,578,102 | 5/1971 | Ross et al. |
| 3,786,409 | 1/1974 | Sorkin |
| 3,789,951 | 2/1974 | Silverman |
| 3,883,725 | 5/1975 | Fort et al. |
| 3,885,225 | 5/1975 | Anstey et al. |
| 3,895,343 | 7/1975 | Farr |
| 3,984,805 | 10/1976 | Silverman |
| 4,042,910 | 8/1977 | Rietsch |
| 4,064,481 | 12/1977 | Silverman |
| 4,159,463 | 6/1979 | Silverman ............................. 367/59 |
| 4,168,485 | 9/1979 | Payton et al. ........................ 367/41 |
| 4,295,213 | 10/1981 | Mifsud ................................. 367/41 |

Primary Examiner—Thomas H. Tarcza
Assistant Examiner—Daniel T. Pihulic
Attorney, Agent, or Firm—Raymond F. Keller; David J. Untener; Larry W. Evans

[57] ABSTRACT

Vibrator seismic sources are operated concurrently to reduce the time required for acquiring the data for a seismic survey. Separate seismic records are produced for each of the concurrently operated vibrator seismic sources. Frequency sweeping pilot signals are generated for each of the separate vibrator seismic sources concurrently in a sequence of at least four sweeps. The pilot signals for each vibrator source have a plurality of separate phase angles during the sweeps. The seismic signals produced by the concurrently operated vibrator seismic sources are detected for each of the sweeps. The detected seismic signals are correlated separately with each of the corresponding pilot signals which were used to drive the vibrator seismic sources that produced the detected seismic signal. The correlating process produces first and second separate correlated records for each of the sweeps. The first correlated records from each sweep are summed to produce a first seismic record which is derived only from a first of the concurrently operated vibrator seismic sources. The second correlated records from the sweeps are summed to produce a second seismic record which is derived only from the second of the vibrator seismic sources. The harmonic distortion caused by the vibrator seismic sources is further reduced by having a plurality of uniform phase differences for each of the pilot signals within each of the pilot sweeps for the vibrator sources.

17 Claims, 2 Drawing Sheets

SEISMIC DATA ACQUISITION TECHNIQUE HAVING SUPERPOSED SIGNALS

The present application is a continuation-in-part of previous application Ser. No. 887,377 filed July 21, 1986 abandoned which is a continuation-in-part of previous application Ser. No. 813,593 filed Dec. 26, 1985 abandoned.

TECHNICAL FIELD

The present invention pertains in general to the field of seismic surveying and in particular to collection and processing of seismic signals.

BACKGROUND OF THE INVENTION

Seismic surveys are carried out on a wide scale throughout the world primarily for defining underground formations to detect and localize petroleum deposits. In past years the primary source of seismic energy for such surveys has been explosives, such as dynamite. However, the current dominant energy source for land seismic exploration is a seismic vibrator. The use of such a vibrator is generally identified by the trademark VIBROSEIS.

The conventional method for collecting seismic records by the use of a vibrator source is to lay out a line or multiple lines of detector geophones and sequentially operate the vibrator source along a series of points on a line of travel. The seismic geophone array and the vibrator is then offset to a different line to collect more information. The cost for producing a seismic survey is closely related to the amount of time required to operate the vibrator, collect the seismic records and move the detector geophones. A primary limiting feature in the speed of collecting seismic data is the use of only a single vibrator source.

In a proposal by R. Garotta entitled "Simultaneous Recording of Several Vibroseis Seismic Lines" (S5.5) presented at the 53rd Annual International Meeting and Exposition of the Society of Exploration Geologists in 1983, it is suggested that vibrators could be operated along parallel lines with either sequential or simultaneous recording. However, the technique proposed by Garotta is severely limited since it provides incomplete separation of sources.

It would be a more economical approach to the collecting of seismic data if there could be simultaneous use of a plurality of vibrator sources. However, the signals from the various vibrator sources would be mixed. Harmonic distortion produced by each of the sources would also be mixed. Therefore, there exists a need for a method for producing separate seismic records which are derived from a plurality of simultaneously operated vibrator seismic sources. Such a method could serve to substantially reduce the cost of producing seismic surveys.

SUMMARY OF THE INVENTION

A selected embodiment of the present invention is a method for producing separate seismic records derived respectively from a plurality of concurrently operated vibrator seismic sources. The seismic records thus produced also have reduced harmonic distortion. The method comprises the following steps. Frequency sweeping pilot signals are generated for respectively driving at least two vibrator seismic sources concurrently in a sequence of at least four sweeps. The pilot signal for each vibrator has a plurality of separate phase angles during the sweeps. One seismic signal is detected which is produced by the concurrently operated vibrator seismic sources. One seismic signal is produced for each of the sweeps. Each of the detected seismic signals is correlated separately with each of the corresponding pilot signals which were used to drive the vibrator seismic sources that produced the detected seismic signal. The step of correlating generates at least first and second separate correlated records for each of the sweeps. The first correlated records for each of the sweeps are summed to produce a first seismic record derived only from a first of the concurrently operated vibrator seismic sources. The second correlated records for each of the sweeps are summed to produce a second seismic record derived only from a second of the vibrator seismic sources. Thus, separate seismic records are derived from concurrently operated vibrator seismic sources.

A further embodiment of the present invention comprises a method for producing separate seismic records derived respectively from a pair of concurrently operated vibrator seismic sources. The seismic records produced by this method have reduced harmonic distortion. The first step comprises generating at a first of the vibrator seismic sources a sequence of eight frequency modulated pilot signals. Each of the pilot signals comprises a sweep and has an increasing frequency through the sweep. The pilot signals for the first seismic source serve to drive the first vibrator seismic source. These pilot signals have respective phase angles of 0°, 45°, 90°, 135°, 180°, 225°, 270° and 315°. The next step comprises generating for a second of the vibrator seismic sources a sequence of eight frequency modulated pilot signals which also have an increasing frequency through the sweep. The pilot signals for the second vibrator seismic source are generated concurrently and respectively with the first vibrator seismic source signals. The pilot signals are therefore generated concurrently in pairs to produce eight pairs of sweeps. The pilot signals for the second vibrator seismic source serve to drive the second vibrator seismic source and have respective phase angles of 0°, 225°, 90°, 315°, 180°, 45°, 270° and 135°. A reflected seismic signal is detected following generation of each pair of the sweeps thereby producing eight seismic signals. Each of the detected seismic signals is correlated with the respective one of the first seismic source signals which serve to produce the corresponding detected seismic signal. This results in the production of eight correlated records for the first seismic source. Likewise, each of the detected seismic signals is correlated with the respective one of the second seismic source signals, which served to produce the corresponding detected seismic signal. This produces eight correlated records for the second seismic source. The eight correlated records for the first seismic source are summed to produce a first seismic record which is derived almost exclusively from the first vibrator seismic source. Finally, the eight correlated records for the second seismic source are summed to produce a second seismic record which is derived almost exclusively from the second vibrator seismic source. Therefore, through this method, separate seismic records are produced from concurrently operated vibrator seismic sources.

A still further embodiment of the present invention is a method for producing separate seismic signals from a plurality of concurrently operated seismic sources. This embodiment differs from the above described embodiment in regard to the production of the pilot signals. For this embodiment each of the pilot signals for the first seismic source is uniformly increased by a predetermined phase increment from the previous pilot signal. Pilot signals for the second seismic source are uniformly decreased by the same phase increment from one pilot signal to the next. As with the other embodiments, the pilot signals for the two seismic sources are generated concurrently and are utilized to drive the corresponding vibrator seismic sources.

BRIEF DESCRIPTION OF THE DRAWINGS

For a more complete understanding of the present invention and the advantages thereof, reference is now made to the following Description taken in conjunction with the accompanying Drawings in which.

DETAILED DESCRIPTION

Figure 1:
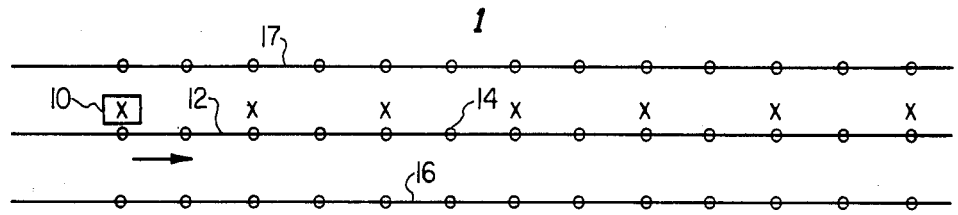
FIG. 1 is a schematic illustration of a conventional technique for collecting seismic data which comprises moving a single vibratory source along a track.

The present invention is directed to a method of collecting seismic data by the use of concurrently operated vibratory seismic sources. The conventional practice for collecting seismic data is by the use of a single seismic source. This process is schematically illustrated in FIG. 1. A vibrator source 10 is placed at sequential locations along a line 12. The vibrator source locations are indicated by the letter X. Line 12 also includes a set of geophones which are indicated by small circles, such as geophone 14. The geophones are also placed at uniform intervals along the line 12. In the majority of applications the geophones are placed along a single line. Parallel and offset from the line 12 there may also be provided geophone lines 16 and 17, each of which has a plurality of geophones placed at uniform intervals. The vibrator source 10 is activated to produce a seismic signal at a first location and then moved to the next location to produce a similar seismic signal. For each generation of a seismic signal, the entire set of geophones, which could possibly be 120, receive the reflected seismic signals produced by the vibrator source 10. After the vibrator source 10 is moved a certain distance along the line 12, the geophones are moved ahead to cover a new area. After an entire line of operation has been completed, the sets of geophones are moved to an offset parallel location, such as to lines 16 and 17, and the vibrator source 10 is worked along a new line.

The conventional process for collecting seismic data is quite time consuming and expensive. The expense becomes even greater when the area of operation is an adverse terrain or climate, such as an extremely cold region. One of the primary cost factors is the amount of time required for operating the vibrator source 10. In many applications the cost of a seismic survey is charged on the number of hours that the crew and equipment are operating in the field. As can be seen in the description of the conventional process shown in FIG. 1, the primary restraining function is the time required to operate the vibrator source 10 and to move it to new locations.

A principle object of the present invention is to make possible the concurrent use of a plurality of vibrator sources so that the overall time required to produce a seismic survey can be substantially reduced.

By using the technique of the present invention, further described below, it is possible to operate two or more vibrator seismic sources concurrently. However, there are many configurations for collecting seismic data in this way. Two such configurations are shown in FIGS. 2 and 3.

Figure 2:
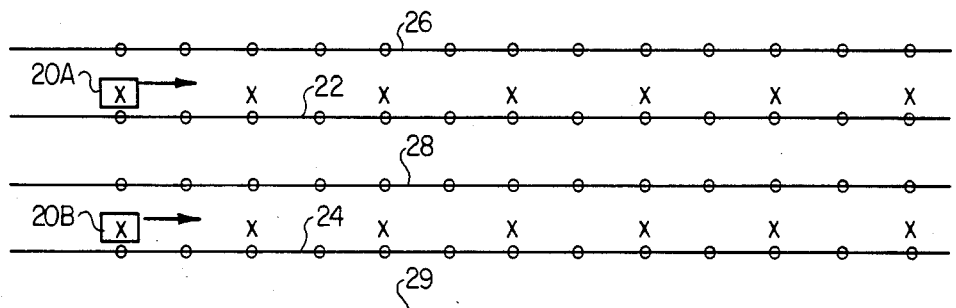
FIG. 2 is a schematic illustration of a technique of the present invention for collecting seismic data by the use of simultaneously operated vibrators.

Referring now to FIG. 2, there are illustrated two vibrator sources 20A and 20B which are respectively worked along lines 22 and 24. Each of the vibrator sources 20A and 20B are positioned at locations shown by a small X along the lines 22 and 24 where they are operated concurrently. The seismic signals produced by the sources are received by an array of geophones. Geophones, indicated by small circles, are placed at uniform locations along the lines 22 and 24 as well as along parallel geophone lines 26, 28 and 29. The concurrent operation of the sources 20A and 20B permits a seismic survey to be completed in approximately one half the time required for a conventional seismic survey, thereby substantially reducing the overall cost of the survey. Further, note for FIG. 2 that after the vibrator sources 20A and 20B have completed the operation along their respective lines, the sources together with the geophones are moved to a parallel area to cover another region of the survey.

Figure 3:
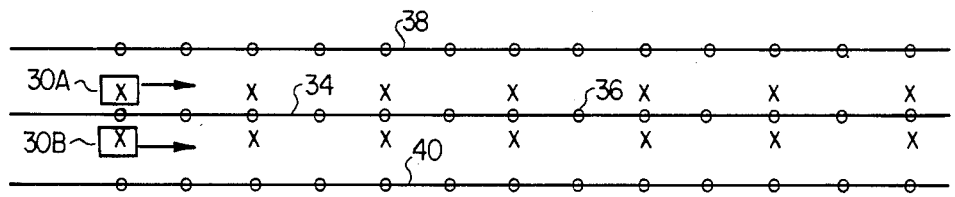
FIG. 3 is a schematic illustration of an alternate technique for collecting seismic data by the use of concurrent vibrators in accordance with the present invention.

Another technique for simultaneous operation of vibrator sources is illustrated in FIG. 3. Vibrator sources 30A and 30B are worked side by side along a line 34 at the locations indicated by the small X's. In this configuration one of the vibrator sources 30 or 32 is a source of compressional waves while the other is a source of shear waves. The line 34 is also a line for a set of geophones which are marked by circles such as 36. On opposite sides of the line 34 there are provided geophone lines 38 and 40 which are provided with uniformly spaced geophones. After the sources 30A and 30B have progressed along the line 34, they can be moved to a parallel line where they are again worked along the line for similar operation. The geophones may be placed only along the line being worked or may be placed along a plurality of parallel lines.

FIGS. 1-3 are schematic illustrations which show techniques and relative locations. These figures are not intended to be a scale or model representation.

Figure 4:
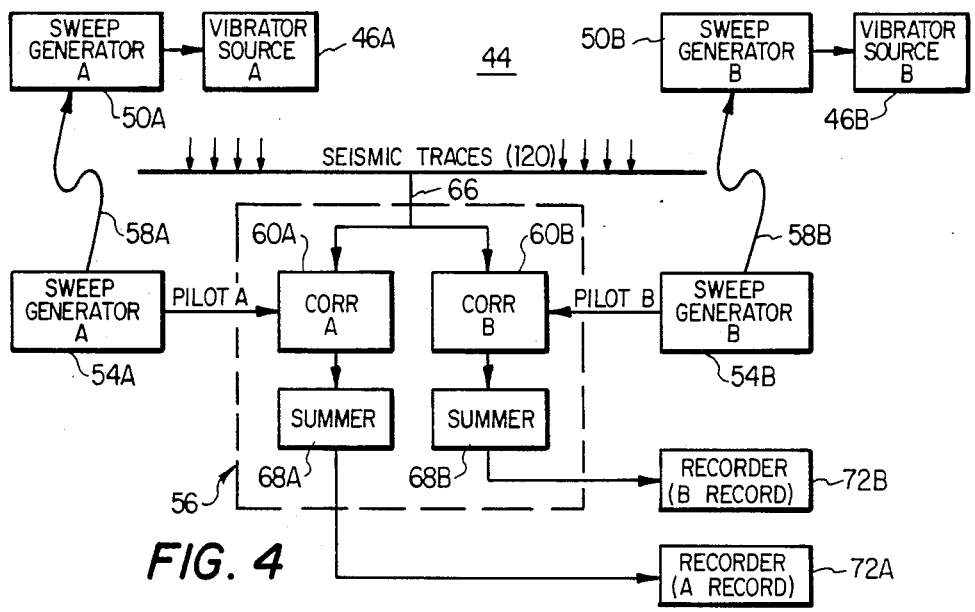
FIG. 4 is a block diagram illustrating apparatus used in accordance with the present invention for collecting, processing and recording seismic data from a plurality of concurrently operated seismic sources.

Referring to FIG. 4 there is illustrated apparatus 44 for carrying out the present invention. The apparatus 44 illustrated in FIG. 4 is for an embodiment of the present invention utilizing two vibrator sources. It is to be understood that the present invention can be expanded to use more than two vibrator sources. A vibrator source 46A is used in collecting data for a data set A and a vibrator source 46B is used in collecting data for a data set B. A sweep generator 50A produces a pilot signal A for driving the source 46A. A sweep generator 50B produces a pilot signal B, which is used to drive the vibrator source 46B.

A sweep generator 54A, for data set A, generates a pilot signal which is provided to an input of a dual correlator 56. The sweep generator 54A is connected through a communication link 58A, typically a radio channel, for triggering the operation of sweep generator 50A.

A sweep generator 54B, for the data set B, produces a pilot signal which is provided to an input of the dual correlator 56. The sweep generator 54B is further connected through a communication link 58B, typically a radio channel, to trigger the operation of sweep generator 50B.

The dual correlator 56 includes an A correlator 60A which receives the A pilot signal A from sweep generator 54A and includes a correlator 60B which receives the pilot signal B from sweep generator 54B.

In a typical seismic survey there are laid out 120 geophones for a single line of geophones for receiving the reflected seismic signals. The group of seismic traces produced by the geophones are input through a channel 66 to the inputs of correlators 60A and 60B.

The output of correlator 60A is provided to a summer 68A and the output of correlator 60B is provided to a summer 68B. The output from summer 68A is transferred to a recorder 72A for the data set A. Likewise, the output from summer 68B is transferred to a recorder 72B for the data set B.

The correlators 60A and 60B together with the summers 68A and 68B comprise dual correlator 56 which may be, for example, a Schmitt Correlator, model SC 6. This equipment is manufactured by Schmitt Consulting, which is located in Columbus, Kans.

The operation of the apparatus 44 of the present invention is now briefly described in reference to FIG. 4. The vibrator sources 46A and 46B are operated concurrently, such as shown in the FIGS. 2 and 3 described above. For each sweep, the pilot signals for driving the sources 46A and 46B are generated by the corresponding sweep generators 50A and 50B. These generators are in turn triggered respectively for concurrent operation by the sweep generators 54A and 54B. The reflected seismic signals produced by the vibrators 46A and 46B are collected and passed through the channel 66 to the inputs of the correlators 60A and 60B. Each of these correlators receives the same collection of seismic traces.

The sweep generators 54A and 54B generate the respective pilot signals A and B. These pilot signals are stored in the respective correlators 60A and 60B. The pilot signals stored in the correlators correspond to the same pilot signals that are generated during each sweep to drive the vibrator sources 46A and 46B. For each sweep, the collected seismic traces are correlated with the pilot signals which were used to drive the vibrators 46A and 46B. Thus, for data set A, the pilot signal used by correlator 60A is the same as the pilot signal used for driving the vibrator source 46A. For data set B, the pilot signal input to the correlator 60B is the same as the pilot signal produced by generator 50B for driving the vibrator source 46B.

The correlators 60A and 60B produce respective first and second correlated records which are then transferred into the respective summers 68A and 68B. Within the summers, the correlated records are point-by-point summed with respect to a common starting time for all of the sweeps taken while the vibrator sources, 46A and 46B are operated at one pair of locations. The resulting summed seismic records are then transferred to the recorders 72A and 72B. Both the correlation and summing operations can be carried out by use of the Schmitt Correlator described above.

Detailed operation of the present invention is further described below.

Figure 5:
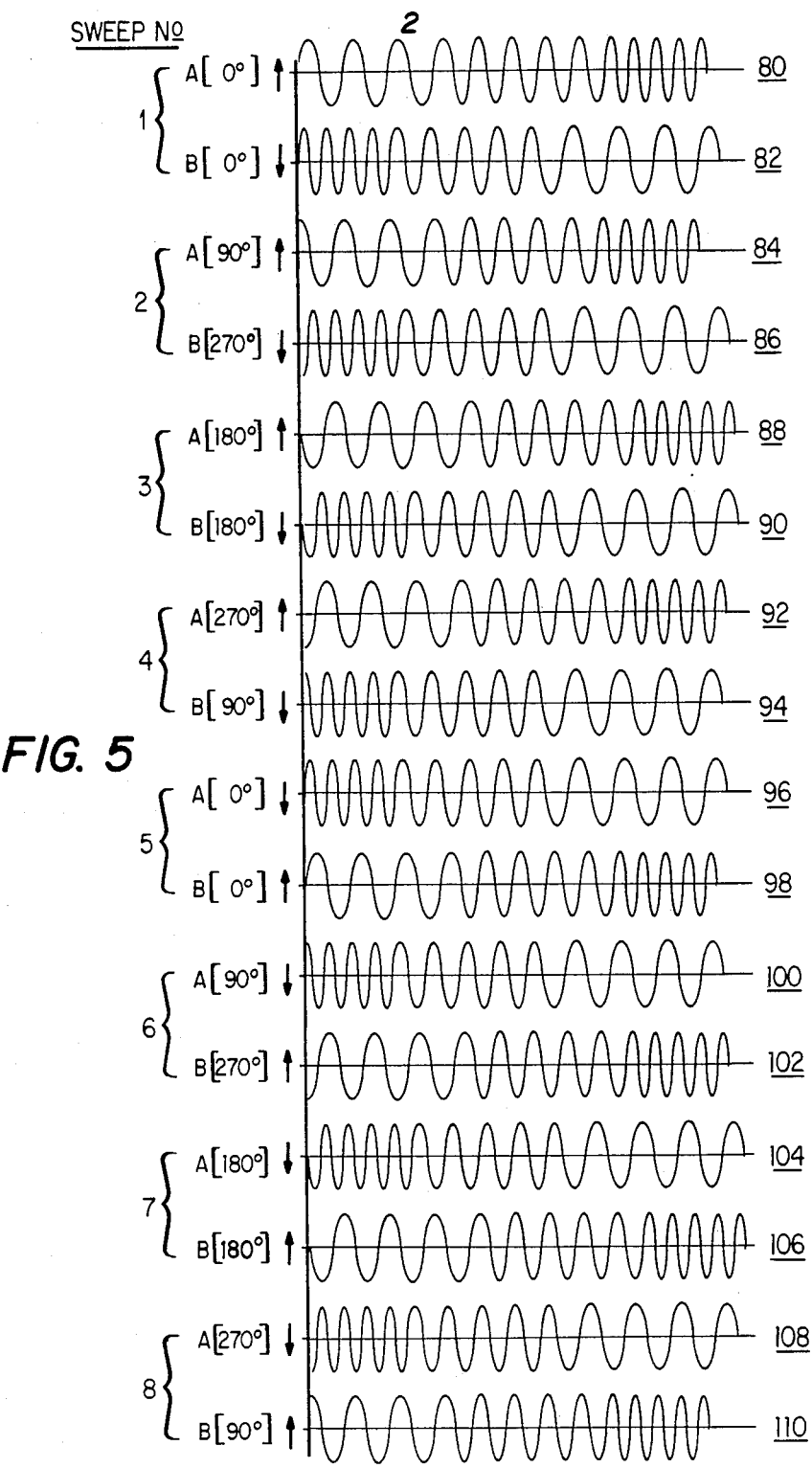
FIG. 5 is a graph illustrating the pilot signals used for driving each unit of a pair of concurrently operated vibrator sources during a sequence of eight sweeps.

The various sweep signals used by the concurrently operated vibrator sources and correlators for a selected embodiment of the present invention are illustrated in FIG. 5. When the two vibrators, identified as A and B, are positioned at a particular location they carry out eight sweeps which are numbered 1-8. For each of the vibrator sources, during each of the sweeps, there is shown the phase angle, direction of sweep (increasing frequency or decreasing frequency) and an illustrative waveform for the pilot signal that drives the vibrator source. The start of the first pilot signal is defined to be the reference zero phase angle.

Referring further to FIG. 5, sweep 1 has pilot signal 80 for data set A and pilot signal 82 for data set B. Note that both signals 80 and 82 start at the 0 phase reference. Signal 80, for data set A, is an up sweep going from 8 hertz up to 80 hertz. Signal 82 for data set B is a down sweep going from a high frequency of 80 hertz down to 8 hertz.

During sweep 2 there is a pilot signal 84 for data set A. Signal 84 starts at a phase reference of 90° and is an up sweep. Pilot signal 86 starts at a reference angle of 270° and is a down sweep. For sweep number 3, a pilot signal 88 starts at a reference phase of 180° and is an up sweep. The data set B pilot signal 90 also starts at a phase angle of 180° but is a down sweep. For sweep number 4 an data set A pilot signal 92 starts at a phase angle of 270° and is an up sweep. The B data set signal for sweep no. 4 starts at a reference angle of 90° and is a down sweep. Sweep 5 has a data set A pilot signal 96 which starts at a 0 phase angle and is a down sweep. A data set B pilot signal 98 is an up sweep which starts at a 0 degree phase angle. For sweep 6, an data set A pilot signal 100 starts at a phase angle of 90° and is a down sweep. A data set B pilot signal 102 starts at a phase angle of 270° and is an up sweep. For Sweep 7, a data set A pilot signal 104 starts at a phase angle of 180° and is a down sweep. A data set B pilot signal 106 starts at a phase angle of 180° and is an up sweep. The sweep number 8 has a data set A pilot signal 108 which starts at a phase angle of 270° and is a down sweep. A data set B pilot signal 110 starts at a phase angle of 90° and is an up sweep.

All of the up sweeps are 8-80 hertz and all of the down sweeps are 80-8 hertz. It is understood that different bandwidths and sweep ranges can also be used.

The present invention is now described in detail in reference to FIGS. 4 and 5. The method of the present invention produces separate seismic records which are derived from a plurality of concurrently operated vibrator seismic sources. The present invention further provides for reducing the harmonic distortion which is produced as an inherent part of the operation of a vibrator seismic source. Concurrent pilot signals are generated for driving at least two vibrator seismic sources concurrently for a sequence of at least 4 sweeps. The pilot signals for each vibrator source have a plurality of separate phase angles during the four sweeps. A seismic signal is detected which is a result of the concurrently operated vibrator seismic sources, with one seismic signal being detected for each of the four sweeps. The detected seismic signals are correlated separately with each of the corresponding pilot signals which were used to drive the vibrator seismic sources that produced the detected seismic signal. The separate correlation of the detected seismic signals generates respective first and second separate correlated records for each of the sweeps. The first of the correlated records for each of the sweeps is summed to produce a first seismic record which is derived from a first of the concurrently operated vibrator seismic sources. The second correlated record from each of the sweeps is summed to produce a second seismic record which is derived from a second of the vibrator seismic sources. The result is the production of separate seismic records derived respectively from concurrently operated vibrator seismic sources.

The method of the present invention is now described in a mathematical context using the following terminology:

$S_A => $ a sweep produced by a data set A vibrator seismic source.

$S_1 => $ the composite of the sweeps produced by the vibrator seismic sources for a first sweep.

$S_A+,- => $ sweep by a source A having a 0° (+) or 180° (−) phase angle.

$R_1 => $ the record produced by the sweep $S_1$.

The most general aspect of the present invention comprises a group of four sweeps $S_1$, $S_2$, $S_3$ and $S_4$ having the polarities of the pilot signals as follows:

$S_1+ > S_A{}^+ \& S_B{}^+$
$S_2+ > S_A{}^+ \& S_B{}^+$
$S_3+ > S_A{}^- \& S_B{}^+$
$S_4+ > S_A{}^- \& S_B{}^-$

Note that both of the vibrator sources have a plurality of phase angles during the group of four sweeps. The uncorrelated records corresponding to sweeps $S_1$-$S_4$ are defined as $R_1$ through $R_4$. The record corresponding to the data set A vibrator source is designated as $R_A$. Likewise, the record corresponding to the vibrator data set B source is designated as $R_B$. The fundamental and odd harmonics for each of these records is produced by summing and differencing the uncorrelated records $R_1$ through $R_4$ in the manner shown below:

$R_A$ (Fund. & odd har.) $= R_1 + R_2 - (R_3 + R_4)$
$R_B$ (Fund. & odd har.) $= R_1 - R_2 + (R_3 - R_4)$ The mathematical process described above for summing and differencing the various records is presented to explain the theory of the present invention. However, when the detected traces are first correlated prior to the step of summation, the mathematical effect is carried out without the need for the various summations and differencing of the records.

Note that in the above mathematical example, the uncorrelated field records are summed and differenced to produce the separate A and B data set field records. In a selected aspect of the invention, which is further described below, the phase angle of the pilot signals is changed in incremental steps through a plurality of sweeps. This aspect of the invention is that described above in reference to FIGS. 4 and 5 wherein the field records are immediately correlated with the corresponding pilot signals. This immediate correlation and summation replaces the above described summing and differencing of the field records.

Note that by use of the plurality of phase angles for both the A and B data sets that there has been produced almost total separation of the A and B sources. However, the odd harmonics produced by the corresponding channel vibrator sources are still present. These harmonics can produce substantial harmonic distortion which can adversely affect the survey record. A further aspect of the present invention includes substantially eliminating the odd harmonics. This is done through the production of specific pilot signals in the following sequence:

$S_1 => S_A{}^0 \& S_B{}^0$
$S_2 => S_A{}^{90} \& S_B{}^{270}$
$S_3 => S_A{}^{180} \& S_B{}^{180}$
$S_4 => S_A{}^{270} \& S_B{}^{90}$

By use of the above pilot signals for the A and B data sets, there can now be produced correlated records $R_{CA}$ and $R_{CB}$ which comprise only the fundamental plus the alternate odd harmonics for the corresponding channels. The symbol * represents correlation of the adjacent quantities. This result is shown below:

$R_{CA}$(Fund+5th+9th ...) $= R_1 * SA^0 + R_2 * SA^{90} + R_3 * SA^{180} + R_4 * S_A{}^{270}$ $R_{CB}$(Fund+5th+9th ...) $= R_1 * SB^0 + R_2 * SB^{270} + R_3 * S_B{}^{180} + R_4 * S_B{}^{90}$ By adding additional sweeps and reducing the steps between the phase angles, the present invention can be expanded to reduce even more of the odd order harmonics. However, in practice the fifth harmonic is of such a small magnitude that its impact upon the resulting record is very small.

Going further with the concept of the present invention, the phases of the sweep can be alternated with up and down frequency sweeping to further enhance the resulting record. To achieve dual source separation together with greater harmonic suppression and correlation noise reduction, an optimum sweep sequence is shown below. This is a dual, polarity encoded, eight sweep sequence of variable phases. The number of sweeps can optionally be increased to have varying bandwidths and center frequencies to enhance still further the resolution of the records. The sequence is as follows:

$S_1 => S_A \uparrow 0 \& S_B \downarrow 0$
$S_2 => S_A \uparrow 90 \& S_B \downarrow 270$
$S_3 => S_A \uparrow 180 \& S_B \downarrow 180$
$S_4 => S_A \uparrow 270 \& S_B \downarrow 90$
$S_5 => S_A \uparrow 0 \& S_B \downarrow 0$
$S_6 => S_A \uparrow 90 \& S_B \downarrow 270$
$S_7 => S_A \uparrow 180 \& S_B \downarrow 180$
$S_8 => S_A \uparrow 270 \& S_B \downarrow 90$ The above sweeps are used in the same manner as described in reference to FIG. 4.

A further embodiment of the present invention is a sweep sequence which comprises a series of eight sweeps. This sequence is defined below.

$S_1 => S_A \uparrow 0 \& S_B \uparrow 0$
$S_2 => S_A \uparrow 45 \& S_B \uparrow 225$
$S_3 => S_A \uparrow 90 \& S_B \uparrow 90$
$S_4 => S_A \uparrow 135 \& S_B \uparrow 315$
$S_5 => S_A \uparrow 180 \& S_B \uparrow 180$
$S_6 => S_A \uparrow 225 \& S_B \uparrow 45$
$S_7 => S_A \uparrow 270 \& S_B \uparrow 270$
$S_8 => S_A \uparrow 315 \& S_B \uparrow 135$ This sweep sequence differs from the previously described sequence in having all of the sweeps being increasing frequency sweeps. In a preferred embodiment these sweeps have a duration of 9 seconds and have a frequency modulated range extending from 10 Hertz to 70 Hertz. It has been found through experimentation that this sweep sequence substantially reduces harmonic distortion thereby providing much cleaner resulting seismic records.

A still further embodiment of the present invention is a sweep sequence which comprises a series of sweeps as defined below.

$S_1 => S_A \uparrow 0 \& S_B \uparrow 270$
$S_2 => S_A \uparrow 45 \& S_B \uparrow 225$
$S_3 => S_A \uparrow 90 \& S_B \uparrow 180$
$S_4 => S_A \uparrow 135 \& S_B \uparrow 135$
$S_5 => S_A \uparrow 180 \& S_B \uparrow 90$
$S_6 => S_A \uparrow 225 \& S_B \uparrow 45$ $S_7 => S_A \uparrow^{270} \& S_B \uparrow^0$
$S_8 => S_A \uparrow^{315} \& S_B \uparrow^{315}$ The sweep sequence described immediately above is termed "reverse phasing". The first of the seismic sources generates a sequence of sweeps with progressively increasing phase angles at uniform steps. The second seismic source also generates a sequence of sweeps with the same incremental phase step, but progressing in the reverse direction. Note that all of the sweeps are upsweeps in this example. If the first seismic source increases the phase angle, then the second seismic source decreases the phase angle. The process could be reversed with the first seismic source decreasing in uniform phase steps while the second seismic source increases in uniform phase steps. Thus, when one seismic source is advancing in phase, the other seismic source is retreating in phase. For the seismic sources the original phase angle does not matter, it is only significant that they rotate in opposite directions and have the same incremental step. This method follows an N−1 rule for determining harmonic supression. The rule is that the first harmonic to appear is N−1 where N is the number of sweeps. Thus, for the above example which has eight sweeps, the first harmonic to appear will be the seventh. All of the lower harmonic noise has been eliminated. If additional sweeps are used, more of the higher level harmonics can be eliminated. Thus, with this technique any desired level of harmonic supression can be implemented.

In summary, the present invention is a method for producing separate seismic records which are derived respectively from a plurality of concurrently operated vibrator seismic sources.

Although several embodiments of the invention have been illustrated in the accompanying Drawings and described in the foregoing Detailed Description, it will be understood that the invention is not limited to the embodiment disclosed, but is capable of numerous rearrangements, modifications and substitutions without departing from the scope of the invention.

I claim:

1. A method for producing separate seismic records derived respectively from a plurality of spaced-apart concurrently operated vibrator seismic sources, the seismic records having reduced harmonic distortion, comprising the steps of:
   geneating frequency sweeping pilot signals for respectively driving at least two of said vibrator seismic sources concurrently in a sequence of at least four sweeps, the pilot signal for each vibrator seismic source having a plurality of initial phase angles during said sweeps,
   detecting a seismic signal produced by said concurrently operated vibrator seismic sources for each of said sweeps,
   correlating each of said detected seismic signals separately with each of the corresponding pilot signals which were used to drive the vibrator seismic sources that produce the detected seismic signal, said step of correlating for generating at least first and second separate correlated records for each of said sweeps,
   summing said first correlated record for each of said sweeps to produce a first seismic record derived predominantly form a first of said concurrently operated vibrator seismic sources, and
   summing the second correlated record for each of said sweeps to produce a second seismic record derived predominantly from a second of said vibrator seismic sources.

2. A method for producing separate seismic records as recited in claim 1 wherein the step of generating frequency sweeping pilot signals comprises generating for each of said vibrators a pilot signal for each of said sweeps, the pilot signal for each vibrator having a plurality of first initial phase angles and a plurality of second initial phase angles which are the inverse of said first initial phase angles.

3. A method for producing separate seismic records as recited in claim 2 wherein said first initial phase angle is 0° and said second initial phase angle is 180°.

4. A method for producing separate seismic records as recited in claim 1 wherein the step of generating frequency sweeping pilot signals comprises generating for each of said vibrators a sequence of pilot signals having a different initial phase angle for each of the sweeps.

5. A method for producing separate seismic records as recited in claim 4 wherein the initial phase angles for the pilot signals for the first of said vibrators are 0°, 90°, 180° and 270° and the initial phase angles for the respective pilot signals for the second of said vibrators are 0°, 270°, 180° and 90°.

6. A method for producing separate seismic records as recited in claim 1 wherein a first of said vibrator sources produces a compression wave seismic signal and a second of said vibrator seismic sources produces a shear wave seismic signal.

7. A method for producing separate seismic records as recited in claim 1, wherein the pilot signal for a first of the vibrator sources has an initial phase angle which increases by a predetermined phase increment for each sweep and the pilot signal for the second of the vibrator sources has an initial phase angle which decreases by said predetermined phase increments for each sweep.

8. Apparatus for producing separate seismic records form spaced-apart vibrator seismic sources with the seismic records having reduced harmonic distortion, comprising:
   first and second vibrator seismic sources for concurrently generating seismic energy in response to receipt of respective pilot signals,
   first and second means for generating said respective pilot signals for driving said vibrator seismic sources, said pilot signals comprising a sequence of at least four sweeps and the pilot signals for each vibrator seismic source having a plurality of initial phase angles during said sweeps,
   means for detecting a seismic signal produced during each of said sweeps of said concurrently operated vibrator seismic sources,
   means for separately correlating each of said detected seismic signals with the corresponding pilot signals which drove said vibrator seismic sources for each said sweep to produce first and second correlated records for each sweep, and
   means for summing said first correlated records from each of said sweeps to produce a first seismic record derived predominantly from said first vibrator seismic source and for summing said second correlated records from each of said sweeps to produce a second seismic record derived predominantly from said vibrator seismic source.

9. Apparatus as recited in claim 8 including third and fourth means for generating said pilot signals, said third and fourth means connected to said means for correlating for supplying said pilot signals thereto and further connected to trigger said first and second means for generating said pilot signals.

10. Apparatus as recited in claim 8 wherein said means for correlating comprises two separate correlators for concurrently correlating said detected seismic signals and said corresponding pilot signals.

11. Apparatus as recited in claim 8 wherein said first vibrator seismic source is a compression wave seismic source and said second vibrator seismic source is a shear wave seismic source.

12. A method for producing separate seismic records derived respectively from a pair of concurrently operated and spaced-apart vibrator seismic sources, the seismic records having reduced harmonic distortion, comprising the steps of:

generating for a first of said vibrator seismic sources a set of eight frequency modulated pilot signals, each pilot signal comprising a sweep and having an increasing frequency through each sweep, said first vibrator seismic source pilot signals for driving said first vibrator seismic source and said first vibrator pilot signals having respective initial phase angles of 0°, 45°, 90°, 135°, 180°, 225°, 270° and 315°, generating for a second of said vibrator seismic sources a set of eight frequency modulated pilot signals, each pilot signal comprising a sweep and having an increasing frequency through each sweep, said second vibrator seismic source pilot signals generated concurrently and respectively with said first vibrator seismic source signals wherein said pilot signals are generated concurrently in pairs to produce eight pairs of sweeps, said second vibrator seismic source pilot signals for driving said second vibrator seismic source and having respective initial phase angles of 270°, 225°, 180°, 135°, 90°, 45°, 0° and 315°, detecting a reflected seismic signal following generation of each pair of said sweeps thereby producing eight seismic signals, correlating each of said detected seismic signals with the respective one of said first seismic source signals which served to produce the corresponding detected seismic signal, thereby producing eight correlated records for said first seismic source, correlating each of said detected seismic signals with the respective one of said second seismic source signals which served to produce the corresponding detected seismic signal, thereby producing eight correlated records for said second seismic source, summing said eight correlated records for said first seismic source to produce a first seismic record, wherein said first seismic record is derived almost exclusively from said first vibrator seismic source, and summing said eight correlated records for said second seismic source to produce a second seismic record, wherein said second seismic record is derived almost exclusively from said second vibratory seismic source.

13. A method for producing separate seismic records as recited in claim 12 wherein each of said pilot signal sweeps has a frequency modulated sweep starting at 10 Hertz and uniformly increasing to 70 Hertz.

14. A method for producing separate seismic records as recited in claim 12 wherein said first vibrator seismic source pilot signals drive said first vibrator seismic source in the initial phase angle sequence of 0°, 45°, 90°, 135°, 180°, 225°, 270° and 315°.

15. A method for producing separate seismic records derived respectively from a pair of concurrently operated and spaced-apart vibrator seismic sources, the seismic source having reduced harmonic distortion, comprising the steps of:

generating a set of pairs of frequency modulated pilot signals, said pairs having a sequence, the first and second pilot signals in each said pair corresponding respectively to said first and second vibrator seismic sources, a first of said pairs having a predetermined initial phase angle for each of the pilot signals therein, the first pilot signal in each of the remaining pairs having an initial phase angle which is increased over the initial phase angle of the first pilot signal in the preceding pair in the sequence by a predetermined phase increment and the second pilot signal in each of the remaining pairs having an initial phase angle which is decreased from the initial phase angle of the second pilot signal in the preceding pair in the sequence by said predetermined phase increment, driving said first and second vibrator seismic sources concurrently with said first and second pilot signals, said driving performed for each of said pairs of pilot signals and said driving not necessarily performed in the order of said sequence, detecting a seismic signal following the driving of said vibrator seismic sources by each pair of said pilot signals thereby producing a sequence of seismic signals, correlating each of said detected seismic signals with the respective one of said first vibrator seismic source pilot signals that served to produce the corresponding detected seismic signal, thereby producing a sequence of correlated records for said first vibrator seismic source, correlating each of said detected seismic signals with a respective one of said second vibrator seismic source signals which served to produce the corresponding detected seismic signal, thereby producing a sequence of correlated records for said second seismic source, summing said sequence of correlated records for said first vibrator seismic source to produce a first vibrator seismic record, wherein said first vibrator seismic record is derived almost exclusively from said first vibrator seismic source, and summing said sequence of correlated records for said second vibrator seismic source to produce a second vibrator seismic record, wherein said second seismic record is derived almost exclusively from said second vibrator seismic source.

16. A method for producing separate seismic records as recited in claim 15 wherein each of said pilot signals is an increasing frequency sweep.

17. A method for producing separate seismic records as recited in claim 15 wherein there are eight pilot signals for said first and second vibrator seismic sources and said phase increment is 45°.

* * * * *